United States Patent
Palanimuthu

(10) Patent No.: US 9,694,747 B2
(45) Date of Patent: Jul. 4, 2017

(54) METHOD AND SYSTEM FOR PROVIDING A COLLISION ALERT

(71) Applicant: Verizon Patent and Licensing Inc., Basking Ridge, NJ (US)

(72) Inventor: Manikandan Palanimuthu, Atlanta, GA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 182 days.

(21) Appl. No.: 14/667,221

(22) Filed: Mar. 24, 2015

(65) Prior Publication Data

US 2016/0280132 A1    Sep. 29, 2016

(51) Int. Cl.
| | |
|---|---|
| B60Q 1/00 | (2006.01) |
| B60Q 9/00 | (2006.01) |
| G08G 1/16 | (2006.01) |
| G06K 9/00 | (2006.01) |
| G01S 13/93 | (2006.01) |

(52) U.S. Cl.
CPC ........ B60Q 9/008 (2013.01); G06K 9/00805 (2013.01); G08G 1/163 (2013.01); G01S 13/931 (2013.01); G01S 2013/9367 (2013.01)

(58) Field of Classification Search
CPC ...................................................... B60Q 9/008
USPC ................................ 340/903, 435; 701/301
See application file for complete search history.

(56) References Cited

U.S. PATENT DOCUMENTS

| | | | |
|---|---|---|---|
| 2007/0152803 A1* | 7/2007 | Huang | B60Q 1/525 340/435 |
| 2012/0119894 A1* | 5/2012 | Pandy | B60W 30/16 340/435 |
| 2013/0144502 A1* | 6/2013 | Shida | B60K 31/0008 701/96 |
| 2014/0324329 A1* | 10/2014 | Abuelsaad | G08G 1/163 701/301 |

\* cited by examiner

*Primary Examiner* — Brent Swarthout

(57) ABSTRACT

An approach is provided for generating a collision alert based on the stopping distance associated with a vehicle based on an identifying characteristic. The approach includes detecting an identifying characteristic of a first vehicle traveling in front of a second vehicle. The approach also includes querying for a stopping distance associated with the first vehicle based on the identifying characteristic. The approach further includes determining an approach speed at which the second vehicle is approaching the first vehicle; and generating a collision alert based on the stopping distance and the approach speed.

20 Claims, 7 Drawing Sheets

METHOD AND SYSTEM FOR PROVIDING A COLLISION ALERT

BACKGROUND INFORMATION

Devices or systems have increasingly become available that provide various information to can promote safe driving. However, lack of driver attention and tailgating still remain the major cause of most driver-related accidents. Providers face significant technical challenges to enabling drivers to be informed of potential collisions. Thus, there is a need for providing alerts of potential collisions.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and system for providing hold status management, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
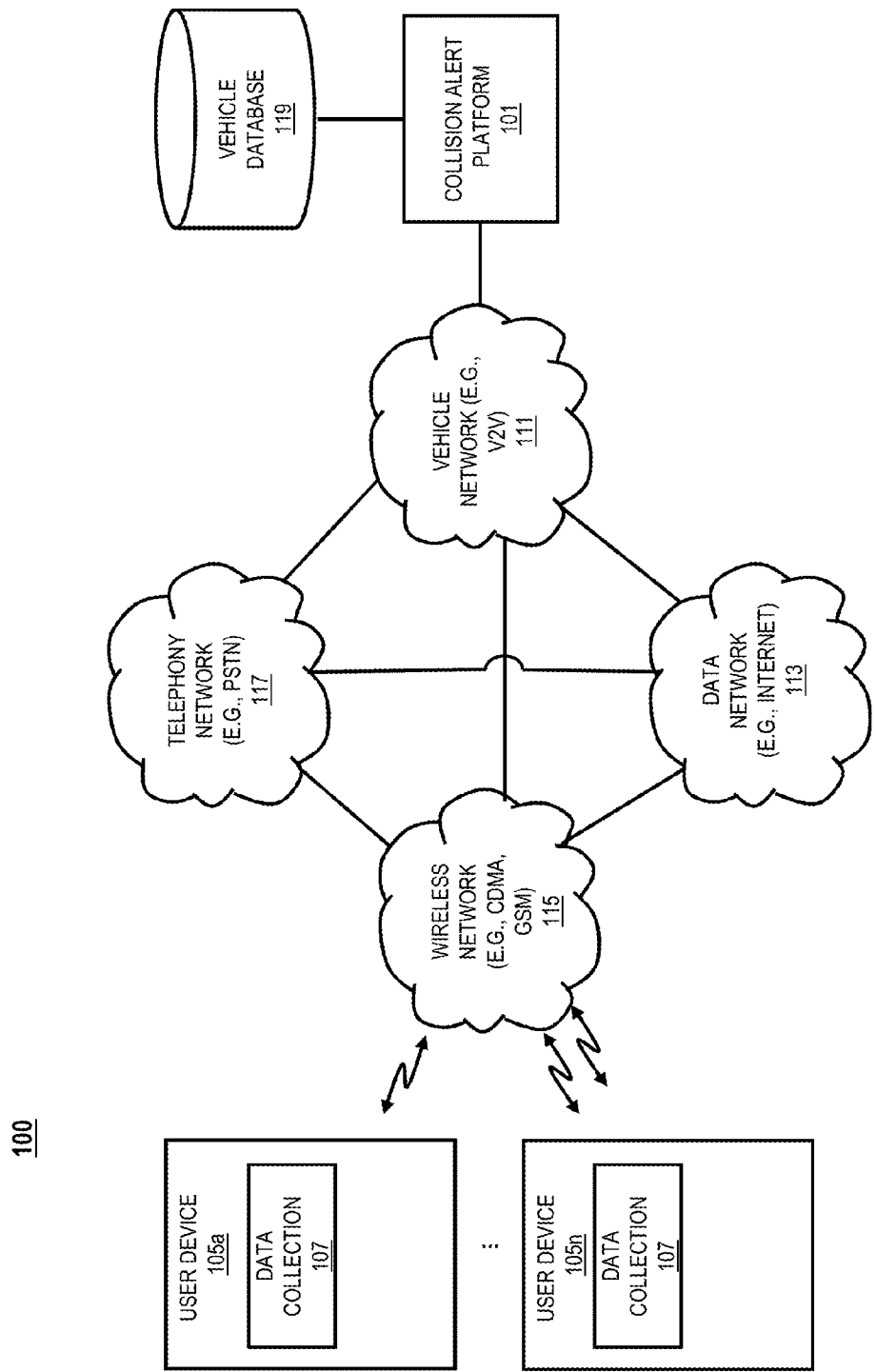
FIG. 1 is a diagram of a system capable of generating a collision alert, according to one embodiment.

FIG. 1 is a diagram of a system capable of generating a collision alert, according to one embodiment. The alert may be based on stopping distance of a vehicle traveling in a path of another vehicle and the approach speed of the vehicle. A vehicle may be any moving vehicle that is capable of carrying one or more human occupants and is powered by any form of energy. For example, vehicle includes, but is not limited to: cars, trucks, vans, minivans, SUVs, motorcycles, scooters, boats, personal watercraft, and aircraft.

Drivers want tools to help prevent collisions, such as rear-end collisions. Current systems generally rely on complex calculations and processing to determine potential collisions. Current systems do not take advantage of publically available information about vehicles that can provide a more accurate stopping distance and thereby provide a more collision alert.

To address this problem, a system 100 of FIG. 1 introduces a capability for a collision platform 101 to generate a collision alert on user devices 105a-105n (also collectively referred to as user device 105) over a network, such as such as the vehicle network 111, data network 113, and wireless network 115. In one embodiment, the user device 105 may communicate over system 100 and include any customer premise equipment (CPE) capable of conducting a communication session over one or more of networks 111-117. For instance, the user device may be a computing device provided in a vehicle, a portable navigation system, mobile device (e.g., any cellular phone, smart phone, wireless, phone, etc.), other mobile computing devices, such as laptop computer, notebook computer, netbook computer, tablet, a desktop computer, and/or other computing devices capable of conducting a communication session over a communication network.

The platform can more accurately prevent rear-end collisions, for example, by utilizing identifying characteristic of vehicles. By way of example, a second vehicle approaching a first vehicle may be alerted of a potential collision if the driver cannot stop without colliding with the other vehicle (e.g., rear-ending). In this way, the approaching second vehicle may be alerted of a potential collision if that vehicle may not be able to be stopped without colliding with the vehicle in front (e.g., rear ending the vehicle). The alert may include but is not limited to an audio, visual, tactile, or a combination thereof. In one embodiment, the alert may include driving information to the driver of the vehicle. For example, the driving information may include increase distance, reduce speed, switch lanes, etc. In one embodiment, the alert may be presented until the approach speed is reduced and/or the distance between the vehicles is increased.

The platform 101 may determine the stopping distance associated with a first vehicle traveling in front of a second vehicle from a query based on a detected identifying characteristic of the first vehicle. The identifying characteristic can include the make, model, a year, a vehicle identification number, or a combination thereof. The system can query a database 119 to determine stopping distance associated with the first vehicle and/or query the internet for the stopping distance associated with the first vehicle. The vehicle information database 119 can store stopping distance(s) associated with one or more identifying characteristics of a vehicle, one or more vehicle features, among others, or a combination thereof. Stopping distances can vary between different vehicles under similar test conditions. By way of example, many car manufacturers, automobile magazines and/or websites, etc., determine the stopping distances for many different makes and models of vehicles for comparison. In this way, the collision alert may be accurately generated.

The platform 101 may detect the identifying characteristic of the first vehicle. In one embodiment, the identifying characteristic may be determined from a vehicle-to-vehicle (V2V) communication link, for example, using the vehicle communication network 111. The vehicle communication network 111 can be any network allowing an exchange of various types of information between motor vehicles and/or roadside units. The vehicle communication network 111 can be a dedicated short range communication (DSRC) network. In some cases, DSRC networks may be configured to operate in the 5.9 GHz band with bandwidth of approximately 75 MHz. Furthermore, DSRC networks may have a range of approximately 1000 m.

In other embodiment, the identifying characteristic may be determined from a captured image of the first vehicle. For example, the platform 101 may utilize cameras provided on the second vehicle to capture an image of the first vehicle in front. The platform 101 may determine the identifying characteristic based on a pattern of one or more vehicle features in the image. The vehicle features may include, but are not limited to, one or more lights mounted on the vehicle. By way of example, the system may determine the make and model of the car by the pattern of tail light(s).

The platform 101 may determine the approach speed at which the second vehicle is approaching a first vehicle in front of it. By way of example, the platform 101 may utilize one or more sensors provided on the second vehicle to determine the approach speed. For example, the platform 101 may determine the approach speed based on information received and/or processed by one or more data collection modules 107. By way of example, the information can include data indicating a rate of change of a distance between the first vehicle and the approaching second vehicle.

The one or more data collection modules 107 may include but is not limited to a Global Positioning System (GPS) configured to estimate a geographic location of a vehicle; a RADAR unit configured to sense objects within an environment of a vehicle using radio signals (e.g., sense speed of objects or vehicles in the environment of the vehicle); a laser rangefinder/LIDAR unit configured to sense objects within an environment of a vehicle using lasers (e.g., sense speed of objects or vehicles in the environment of the vehicle); a camera (e.g., a still camera, video camera, etc.) configured to capture images of the environment of the vehicle other sensors configured to monitor internal systems of a vehicle (e.g., $O_2$ monitor, fuel gauge, engine oil temperature, speedometer); among others; or a combination thereof.

The platform 101 generates a collision alert based on the stopping distance and the approach speed. The collision alert may be a visual, audio and/or tactile alert. By way of example, the platform 101 may present a collision alert on one of the peripherals provided in the vehicle. The peripherals may be configured to allow interaction between a vehicle and external sensors, other vehicles, other computer systems, and/or a user. For example, the peripherals can include but are not limited to a user interface provided in the vehicle, a user interface provided in a navigation system provided in the vehicle, speaker, among others, or a combination thereof.

In one embodiment, the platform 101 can initiate a generation of the collision alert, a presentation of the collision alert, or a combination thereof, based on an alert trigger value. The alert trigger value may be determined based on the stopping distance of the first vehicle being approached, the stopping distance of the approaching second vehicle, the approach/closing speed, or a combination thereof. By way of example, the platform 101 can initiate the collision alert when the alert trigger value indicates that the approaching second vehicle will likely hit the vehicle in front if the vehicle in front abruptly stops, based on the stopping distance, the approach speed, or a combination thereof. For example, the approaching second vehicle may not have sufficient distance to stop due to the stopping distance of that vehicle, the first vehicle in front, and/or the approach speed.

In one embodiment, the collision alert platform 101 can take into account contextual information associated with the first vehicle, the second vehicle, an environment in the first vehicle, the second vehicle, or a combination thereof are traveling, or a combination thereof. In one embodiment, the contextual information may be provided by the one or more data collection modules 107. By way of example, the contextual information may be any information that can be relevant to determining the stopping distances, threshold, and/or alerts. For example, the contextual information may include but is not limited to vehicle maintenance condition (e.g., tire condition, brake conditions, etc.), road conditions, road type (e.g., gravel, paved, etc.), weather (e.g. raining, snowing, sunny, etc.), vehicle load, among others, or a combination thereof. By way of example, if it is raining, the stopping distance may be longer and therefore the alert trigger value may differ from dry roads. In this way, the collision alert can be more accurate.

In one embodiment, the collision alert platform 101 may interface with the user device 105 to perform one or more functions described herein. In one embodiment, the system 100 may support different configurations of the platform 101 depending on whether the embodiments of the features described herein are implemented as device-based features or network-based features. For example, the platform 101 may be native to the device 105. The all or some of the functions of the platform 101 may be downloadable as an application.

For illustrative purposes, the networks 111-117 may be any suitable wireline and/or wireless network, and may be managed by one or more service providers. For example, data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network. Wireless network 115 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, telephony network 117 may include a circuit-switched network, such as the public switched telephone network (PSTN), an integrated services digital network (ISDN), a private branch exchange (PBX), or other like network.

Although depicted as separate entities, networks 111-117 may be completely or partially contained within one another, or may embody one or more of the aforementioned infrastructures. It is further contemplated that networks 111-117 may include components and facilities to provide for signaling and/or bearer communications between the various components or facilities of system 100. In this manner, networks 111-117 may embody or include portions of an SS7 network, or other suitable infrastructure to support control and signaling functions.

Figure 2:
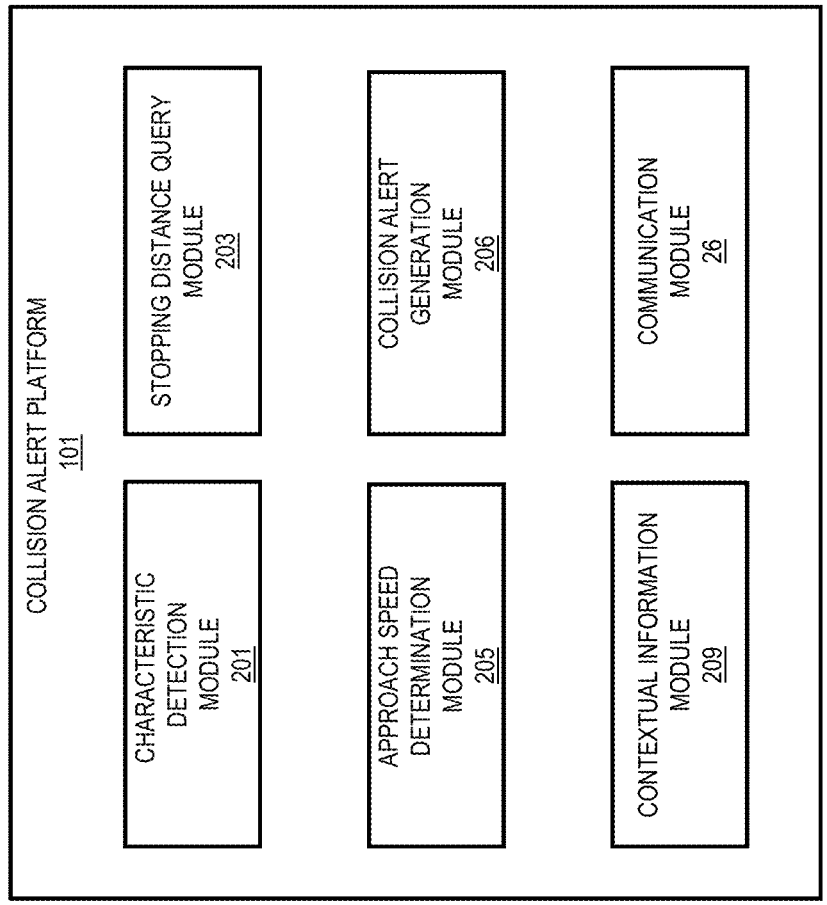
FIG. 2 is a diagram of a collision alert platform capable of generating a collision alert, according to one embodiment.

FIG. 2 is a diagram depicting the components of the collision alert platform 101, according to one embodiment. The collision alert platform 101 includes various executable modules for performing one or more computing, data processing and network based instructions that in combination provide a means for managing hold status of a communication Such modules can be implemented in hardware, firmware, software or a combination thereof. Although the collision alert platform 101 is depicted as a standalone component, it is contemplated that the collision alert platform 101 and/or its functions may be implemented in other components of the system 100 including the user devices 105.

By way of example, the collision alert platform 101 may include a characteristic detection module 201, a stopping distance query module 203, approach speed determination module 205, collection alert generation module 207, a contextual information module 209, and a communication module 211. These modules 201-211 can interact with the vehicle database 119 and the internet (e.g., data network 113) in support of their functions. According to some embodiments, the vehicle database 119 are maintained and updated based, at least in part, on one or more operations conducted on user devices 105.

In one embodiment, the characteristic detection module 201 detects an identifying characteristic of a first vehicle in a path of second vehicle. In one embodiment, the characteristic detection module 201 can detect an identifying characteristic of the first vehicle by utilizing one or more data collection modules 107 to determine one or more features about the vehicle and/or by a communication link. By way of example, for a first vehicle traveling in front of a second vehicle, the characteristic detection module 201 can initiate a capturing of an image of the first vehicle in front, for example, by causing the camera to take an image of the rear of the first vehicle in front. The characteristic detection module 201 can process the captured image to identify one or more vehicle features in the environment of the first vehicle. In this example, the characteristic detection module 201 can use computer vision techniques, for example, to determine a pattern of one or more vehicle features in the image and thereby determine the identifying characteristic. For example, the characteristic detection module 201 can determine the make, model, year, etc. from a pattern of one or more tail lights of the first vehicle. In one embodiment, one or more patterns of one or more vehicle features may be associated with an identifying characteristic of a vehicle and stored in the vehicle information database 119.

In another example, the characteristic detection module 201 can initiate a vehicle-to-vehicle communication link to detect the identifying characteristic of the first vehicle. For example, during the vehicle-to-vehicle communication link, using a vehicle-to-vehicle communication protocol, the first vehicle can provide make, model, year, vehicle identification number, among others, to the second vehicle. This providing of information may occur in response to a request from a device in a second vehicle that follows the first vehicle—or vice versa. For example, a leading first vehicle may detect that a second vehicle following it is too close, or closing quickly, and may send a request to a device in the trailing second vehicle that that the trailing second vehicle either needs to slow down, or transmit back in response vehicle characteristics that can be used to identify the trailing second vehicle and determine, based on the trailing second vehicle identity, that the trailing second vehicle can stop much quicker than the leading first vehicle, thus facilitating a new determination of an alert trigger value to override a default alert trigger value.

The stopping distance query module 203 queries a stopping distance associated with the first vehicle based on the identifying characteristic. In one embodiment, the stopping distance query module 203 queries the vehicle information database 119 for the stopping distance. In another embodiment, the stopping distance query module 203 queries the internet, for example, one or more automobile review websites and/or the manufacturer website for the stopping distance.

In one embodiment, the stopping distance query module 203 may also query the stopping distance associated with a second vehicle that is either behind and/or in front of the first vehicle. In one embodiment, the stopping distance query module 203 may also query the stopping distance associated with the first vehicle and/or the second vehicle based on contextual information associated with the vehicle, the other vehicle, the traveling environment, or a combination thereof. For example, the contextual information module 209 can collect information associated with the road conditions, road type, weather, vehicle maintenance condition, etc. By way of example, a car manufacturer may determine stopping distances for a vehicle under different road conditions and/or types.

The approach speed determination module 205 determines the approach speed of the vehicle. The approach speed may be used the collision alert generation module 207 to generate a collision alert. For example, the approach speed determination module 205 may use the data collection modules 107 and/or vehicle-to-vehicle communication to obtain information related to data indicating a rate of change of a distance between the first vehicle and the second vehicle. By way of example, the approach speed determination module 205 may determine the speed of the first vehicle in front of the second vehicle using the data collection modules 107 (e.g., laser and/or radar) and/or vehicle-to-vehicle communication and speedometer of the second vehicle to determine the approach speed.

The collision alert generation module 207 generates a collision alert based on the stopping distance determined by the stopping distance query module 203 and the approach speed determined by the approach speed determination module 205. The collision alert can indicate a high probability of collision between the first vehicle and the second vehicle. In one embodiment, the collision alert generation module 207 may initiate the generating of the collision alert, a presentation of the collision alert, or a combination thereof based on an alert trigger value. The collision alert generation module 207 may calculate the alert trigger value based on the stopping distance of the first vehicle determined by the stopping distance query module 203, the stopping distance of the second vehicle determined by the stopping distance query module 203, the approach speed determined by the approach speed determination module 205, or a combination thereof. In one embodiment, the collision alert generation module 207 may determine the alert trigger value and/or the collision alert also based on the contextual information determined by the contextual information module 209. By way of example, the alert trigger value may indicate a stopping distance threshold. In this example, the alert trigger value may indicate a distance in which the second vehicle can safely stop without hitting the first vehicle in front. In this example, if the second vehicle is too close to the first vehicle and/or will be too close to the first vehicle based on the approach speed and the stopping distance(s), the collision alert generation module 207 can cause an initiation of the generating of the collision alert, a presentation of the collision alert, or a combination thereof.

In one embodiment, the collision alert generation module 207 may cause the collision alert be presented. For example, the collision alert generation module 207 may cause a visual and/or audio alert to be present on a user interface in the first vehicle and/or the second vehicle. In the above example, for the approaching second vehicle, the alert may indicate to slow down, increase distance between vehicles, among others. In yet another example, an alert may be presented to the first vehicle in front and may indicate to speed up, increase distance between vehicles, among others, or a combination thereof. In one embodiment, the collisional alert generation module 207 may also additionally and/or alternatively present a tactile collision alert. For example, the collisional alert generation module 207 may cause the driver seats to shake to alert the driver of the potential collision. This can be in addition to an audio and/or visual collision alert.

The contextual information module 209 can determine the contextual information. In some embodiments, the contextual information module 209 can utilize one or data collection modules 107.

In one embodiment, the communication module 211 executes various protocols and data sharing techniques for enabling collaborative execution between the collision alert platform 101, the user devices 105 (e.g., between vehicles), the networks 111-117, and other components of the system 100. In addition, the communication module 211 enables generation of signals for communicating with various elements of the vehicle network 111, including various gateways, policy configuration functions and the like.

Figure 3:
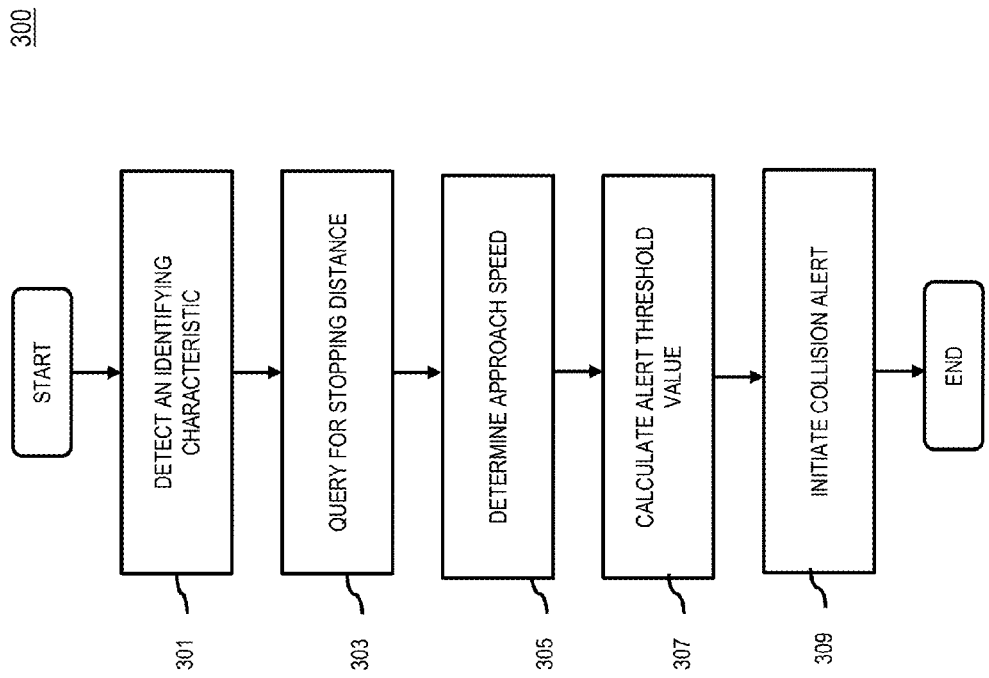
FIG. 3 is a flowchart of generating a collision alert, according to one embodiment.
Figure 4:
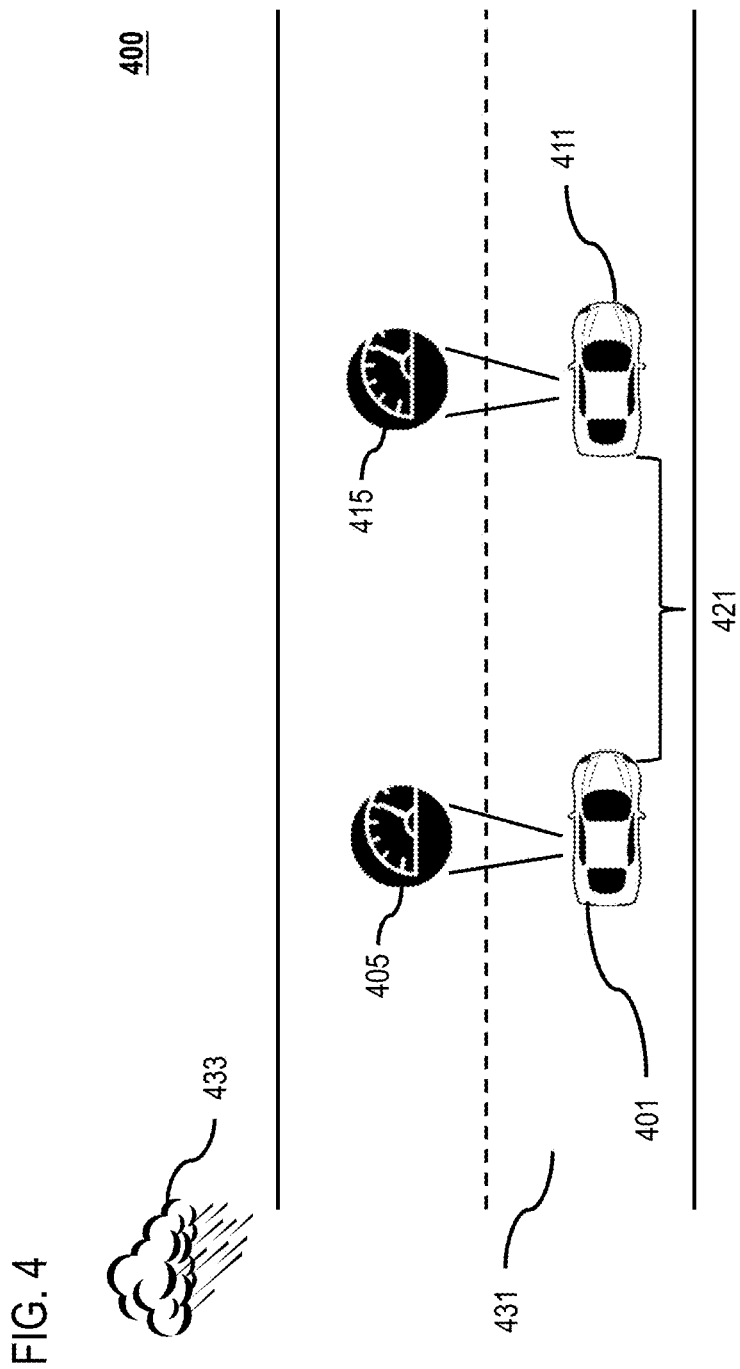
FIG. 4 is an example of a collision alert scenario.
Figure 7:
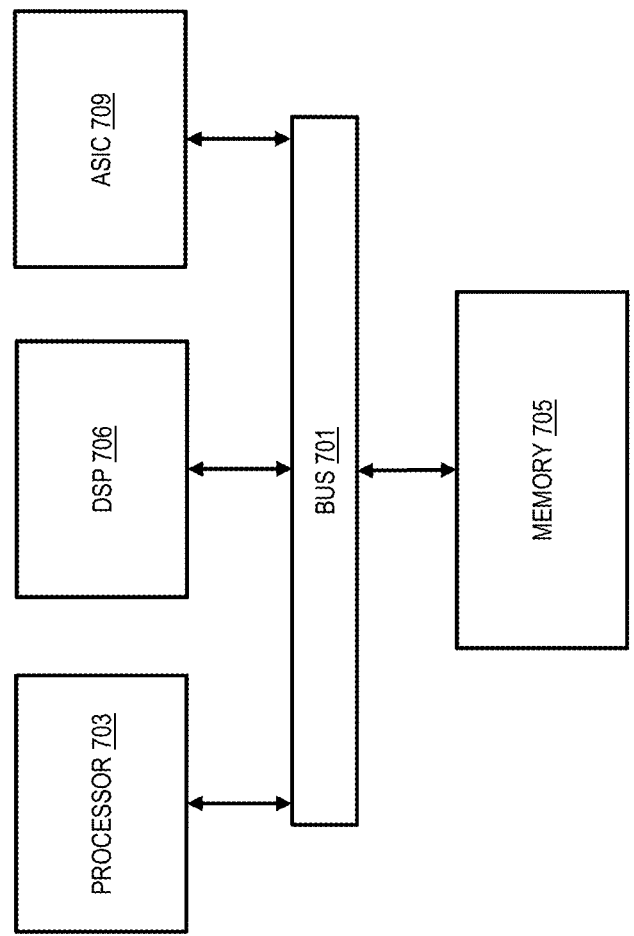
FIG. 7 is a diagram of a chip set that can be used to implement various exemplary embodiments.

FIG. 3 is a flowchart of executing various collision alert features, according to one embodiment. In one embodiment, the collision alert platform 101 performs the process 300 and is implemented in, for instance, a chip set including a processor and a memory as shown in FIG. 7. In addition or alternatively, an application may perform all or a portion of the process 300. Although FIG. 3 illustrates steps 301 through 309 in a particular order, the order and number of steps is merely for explanation, and one or more steps may be performed in a different order or removed. FIG. 3 is also described with respect to collision scenario shown in FIG. 4. In this example, the collision alert platform 101 can determine a likelihood that a second vehicle 401 will rear-end a first vehicle 411.

In step 301, the collision alert platform 101 detects an identifying characteristic of a first vehicle traveling in front of a second vehicle. In the scenario shown in FIG. 4, the collision platform 101 can detect the identifying characteristic of the first vehicle 411, which is in front of the second vehicle 401. In one embodiment, the collision alert platform 101 may initiate a camera provided on the front of the second vehicle 401 to take an image of the rear of the first vehicle 411. The collision alert platform 101 can process the image to determine the identifying characteristic based on a pattern of one or more vehicle features visible in the image. By way of example, the collision alert platform 101 can process the image to determine the pattern of one or more lights (e.g., tail lights, stop lights, etc.) to determine the make, model, year, etc., or a combination thereof of the first vehicle 411.

In another embodiment, the collision alert platform 101 may initiate a vehicle-to-vehicle communication link between the vehicles 401 and 411 to obtain information to detect the identifying characteristic (e.g., make, model, year, vehicle identification information, etc., or combination thereof) of the first vehicle 411.

In step 303, the collision alert platform 101 queries for a stopping distance associated with the vehicle based on the identifying characteristic. In the example shown in FIG. 4, the collision alert platform 101 can query the vehicle information database 119 and/or the internet (e.g., manufacturer website, automobile review websites, etc.) for the stopping distance based on the identifying characteristic associated with the first vehicle 411. In one example, the collision alert platform 101 can query the vehicle information database 119 and/or internet for vehicle model and year corresponding to the pattern of lights provided on the rear of the first vehicle 411.

In one embodiment, the collision alert platform 101 may also query for another stopping distance. By way of example, the collision alert platform 101 may query for the stopping distance of the second vehicle 401. In other embodiments, the collision alert platform 101 may have the stopping distance for the second vehicle 401 stored in the default settings.

In another embodiment, the collision alert platform 101 may take into account contextual information when querying for the stopping distance, the other stopping distance, or a combination thereof. For example, the collision alert platform 101 may take into account road condition 431, maintenance condition of the vehicles 401 and/or 411, weather 433, road type 431, etc. when querying for the stopping distance. In the example shown in FIG. 4, the weather 433 is raining. In this example, the stopping distance will be greater. In another embodiment, the collision alert platform 101 may take into account the contextual information when determining the alert trigger value if the stopping distance associated with the first vehicle 411 and/or second vehicle 401 and that contextual information is not available.

In step 305, the collision alert platform 101 determines an approach speed. In one embodiment, the collision alert platform 101 may determine the approach speed of the second vehicle 401. In this example, the collision alert platform 101 may obtain data indicating a rate of change of a distance 421 between the first vehicle 411 and the second vehicle 401 from one or more data collection modules 107. For example, the second vehicle 401 may have a laser and/or radar sensor that can determine the speed 415 of the first vehicle 411. The second vehicle 401 may also have a GPS that can be used to determine the positions of the vehicle 401 with respect to the first vehicle 411. The collision alert platform 101 can calculate the approach speed based on the speed 415 of the first vehicle 411, speed 405 of the second vehicle 401, and the distance 421 between the vehicles. In another example, the collision alert platform 101 may obtain the data related to the first vehicle 411 (e.g., speed, position, etc.) from a vehicle-to-vehicle communication link.

In step 307, the collision alert platform 101 may calculate an alert trigger value based on the stopping distance of the second vehicle (401), the other stopping distance of the first vehicle (411), the approach speed, or a combination thereof. The alert trigger value may indicate a likelihood that a collision may occur. In one embodiment, the collision alert platform 101 may take into account the contextual information when determining the alert trigger value. For example, the collision alert platform 101 may adjust the alert trigger value based on the raining weather conditions 433 and the poor quality of brakes of the first vehicle 411.

In step 309, the collision alert platform 101 can initiate generating the collision alert, presenting the collision alert, or a combination thereof based on the alert trigger value. In one embodiment, the collisional alert platform 101 may initiate the collision alert when the alert trigger value is outside a range of safe values and/or safe value. For example, the safe value may correspond to a safe distance between vehicles, speed, etc., in which the second vehicle (401) can likely stop without colliding with the first vehicle (411) in front. In one embodiment, the collision alert platform 101 may take into account the contextual information when determining the collision alert. For example, the collision alert platform 101 may adjust the alert trigger value based on the raining weather conditions 433 and the poor quality of brakes of the first vehicle 411.

For example, the alert can indicate that the vehicle 401 should slow down, increase the distances between the vehicles 401 and 411 (e.g., by changing lanes) etc., among others, or a combination thereof. In one embodiment, the collision alert may include a visual alert, an audio alert a tactile alert, or a combination thereof. The type of collision alert can be preselected and stored in the settings. For example, the alert may be presented on the user interface of the second vehicle 401 while an audio alert is also being presented. In another example, the driver's seat may also shake to better ensure that the driver's attention is directed to the potential collision.

In one embodiment, the collision alert platform 101 can additionally or alternatively generate a collision alert to the first vehicle (e.g., the leading vehicle). In one example, the collision alert platform 101 can present a collision alert to the first vehicle 411. For example, the alert can indicate that the first vehicle 411 should speed up, increase the distance between the vehicles 401 and 411 (e.g., by changing lanes), etc., among others, or a combination thereof.

In one embodiment, the collision alert platform 101 can additionally or alternatively generate a collision alert from the perspective of the leading vehicle. For example, with respect to FIG. 4, the collision alert platform 101 can process information and data to generate a collision alert from the perspective of the first vehicle 411. In this example, the collision alert platform 101 can determine the approach speed of the second vehicle 401 with respect to the first vehicle 411.

Figure 5:
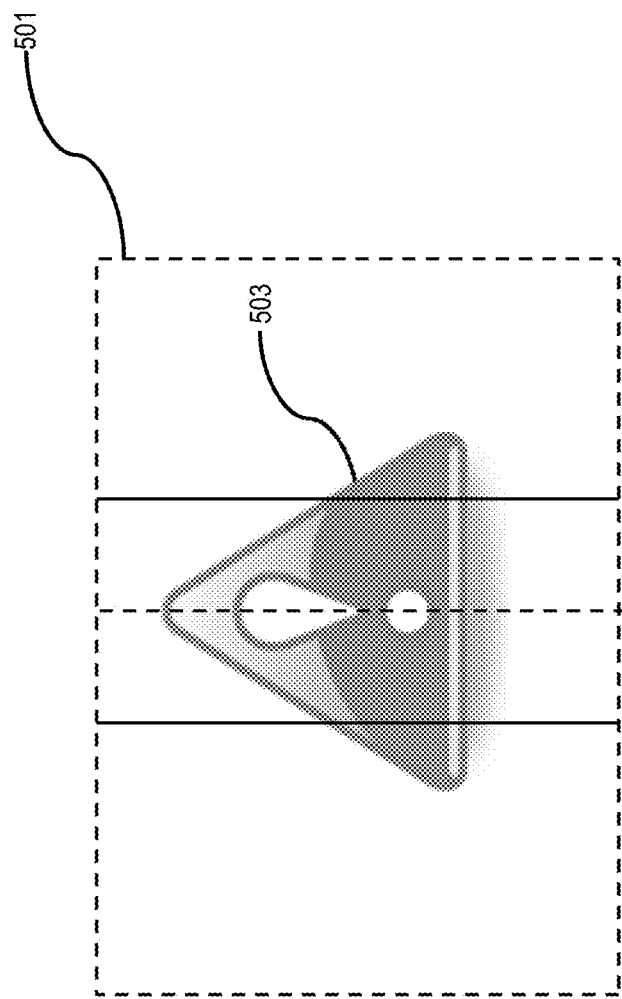
FIG. 5 is a diagram of a user interface utilized in the process of FIG. 3, according to one embodiment.

FIG. 5 is a diagram of a user interface utilized in the process of FIG. 3, according to one embodiment. FIG. 5 illustrates the alert presented on the user interface when the collision alert platform 101 presents a visual collision alert on a user interface. The user interface shown in FIG. 5 can be a display provided on a dashboard in a vehicle (e.g., control interface and/or GPS interface) and/or a separate GPS system. In one embodiment, the alert may also provide information regarding the alert (e.g., approach speed is too fast) and/or instructions to the driver regarding how to remove the collision alert (e.g., change speed, change lanes, etc.).

In one embodiment, the collision alert platform can also present an audio and/or tactile alert along with the visual alert. In one embodiment, the collision alert platform 101 can present the collision alert until the alert trigger value is within the safe range and/or the potential collision is no longer present (e.g., the vehicle in front of another vehicle and/or the other vehicle change lanes).

Figure 6:
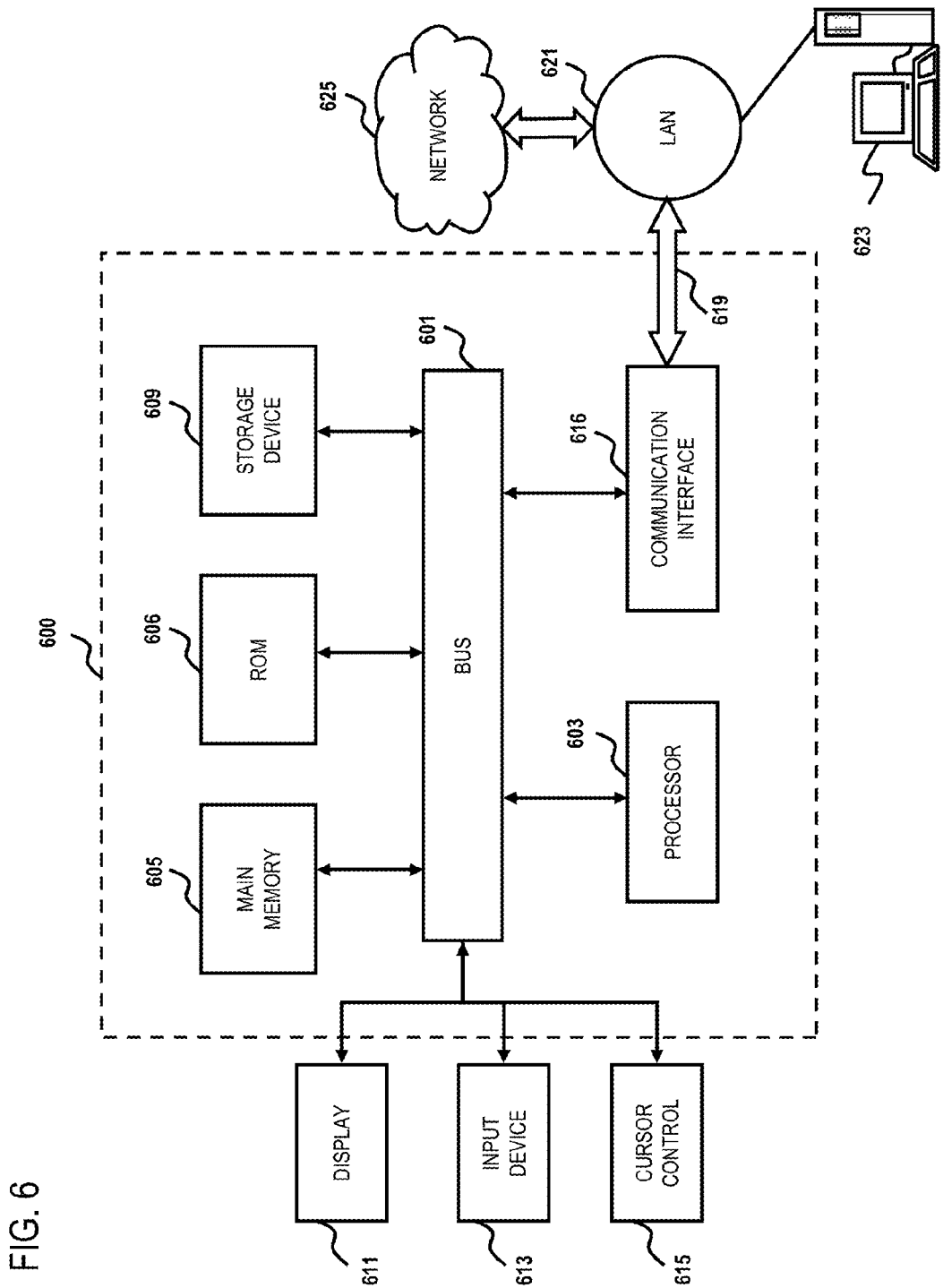
FIG. 6 is a diagram of a computer system that can be used to implement various exemplary embodiments.

FIG. 6 illustrates computing hardware (e.g., computer system) upon which an embodiment according to the invention can be implemented. The computer system 600 includes a bus 601 or other communication mechanism for communicating information and a processor 603 coupled to the bus 601 for processing information. The computer system 600 also includes main memory 605, such as random access memory (RAM) or other dynamic storage device, coupled to the bus 601 for storing information and instructions to be executed by the processor 603. Main memory 605 also can be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 7 illustrates a chip set 700 upon which an embodiment of the invention may be implemented. Chip set 700 is programmed to present a slideshow as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 700, or a portion thereof, constitutes a means for performing one or more steps of FIG. 3.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

The invention claimed is:

1. A method comprising:
   detecting an identifying characteristic of a first vehicle traveling in front of a second vehicle, the detection of the identifying characteristic including:
     initiating a capturing of an image of the first vehicle, and
     processing the image to determine the identifying characteristic based on a pattern of one or more vehicle features visible in the image, the one or more vehicle features including lights mounted on the first vehicle;
   querying, based on the identifying characteristic, for a stopping distance associated with the first vehicle;
   determining an approach speed at which the second vehicle is approaching the first vehicle; and
   generating a collision alert based on the stopping distance and the approach speed.

2. The method of claim 1, further comprising:
   initiating a vehicle-to-vehicle communication link between the first vehicle and the second vehicle as part of the detection of the identifying characteristic.

3. The method of claim 1, wherein the identifying characteristic includes a make, a model, a year, a vehicle identification number, or a combination thereof associated with the first vehicle.

4. The method of claim 1, further comprising:
calculating the approach speed based on data indicating a rate of change of a distance between the first vehicle and the second vehicle.

5. The method of claim 1, further comprising:
calculating an alert trigger value based on the stopping distance of the first vehicle, another stopping distance of the second vehicle, the approach speed, or a combination thereof; and
initiating the generating of the collision alert, a presentation of the collision alert, or a combination thereof based on the alert trigger value.

6. The method of claim 5, further comprising:
determining contextual information associated with the first vehicle; the second vehicle; an environment in which the first vehicle, the second vehicle, or a combination thereof are traveling in; or a combination thereof,
wherein the stopping distance, the other stopping distance, the alert trigger value, the collision alert, or a combination thereof are further based on the contextual information.

7. An apparatus comprising:
a non-transitory computer-readable medium containing program instructions; and
a processor to execute the program instructions to:
detect an identifying characteristic of a first vehicle traveling in front of a second vehicle, the detection of the identifying characteristic including:
initiating a capture of an image of the first vehicle, and
processing the image to determine the identifying characteristic based on a pattern of one or more vehicle features visible in the image, the one or more vehicle features including lights mounted on the first vehicle;
query, based on the identifying characteristic, for a stopping distance associated with the first vehicle;
determine an approach speed at which the second vehicle is approaching the first vehicle; and
generate a collision alert based on the stopping distance and the approach speed.

8. The apparatus of claim 7, wherein the processor is further to:
initiate a vehicle-to-vehicle communication link between the first vehicle and the second vehicle as part of the detection of the identifying characteristic.

9. The apparatus of claim 7, wherein the identifying characteristic includes a make, a model, a year, a vehicle identification number, or a combination thereof associated with the first vehicle.

10. The apparatus of claim 7, wherein the processor is further to execute the program instructions to:
calculate the approach speed based on data indicating a rate of change of a distance between the first vehicle and the second vehicle.

11. The apparatus of claim 7, wherein the processor is further to execute the program instructions to:
calculate an alert trigger value based on the stopping distance of the first vehicle, another stopping distance of the second vehicle, the approach speed, or a combination thereof; and
initiate the generating of the collision alert, a presentation of the collision alert, or a combination thereof based on the alert trigger value.

12. The apparatus of claim 11, wherein the processor is further to execute the program instructions to:
determine contextual information associated with the first vehicle; the second vehicle; an environment in which the first vehicle, the second vehicle, or a combination thereof are traveling in; or a combination thereof,
wherein the stopping distance, the other stopping distance, the alert trigger value, the collision alert, or a combination thereof are further based on the contextual information.

13. A non-transitory computer-readable medium containing program instructions for causing one or more processors to:
detect an identifying characteristic of a first vehicle traveling in front of a second vehicle, the detection of the identifying characteristic including:
initiating a capture of an image of the first vehicle, and
processing the image to determine the identifying characteristic based on a pattern of one or more vehicle features visible in the image, the one or more vehicle features including lights mounted on the first vehicle
query, based on the identifying characteristic, for a stopping distance associated with the first vehicle,
determine an approach speed at which the second vehicle is approaching the first vehicle, and generate a collision alert based on the stopping distance and the approach speed.

14. The non-transitory computer-readable medium of claim 13, wherein the program instructions further cause the one or more processors to:
initiate a vehicle-to-vehicle communication link between the first vehicle and the second vehicle as part of the detection of the identifying characteristic.

15. The method of claim 1, wherein the processing of the images to determine the identifying characteristic includes determining a make and model of the first vehicle based on a pattern of the lights mounted on the first vehicle.

16. The method of claim 15, wherein the one or more vehicle features include tail lights of the first vehicle.

17. The apparatus of claim 7, wherein the processing of the images to determine the identifying characteristic includes determining a make and model of the first vehicle based on a pattern of the lights mounted on the first vehicle.

18. The apparatus of claim 17, wherein the one or more vehicle features include tail lights of the first vehicle.

19. The non-transitory computer-readable medium of claim 13, wherein the processing of the images to determine the identifying characteristic includes determining a make and model of the first vehicle based on a pattern of the lights mounted on the first vehicle.

20. The non-transitory computer-readable of claim 15, wherein the one or more vehicle features include tail lights of the first vehicle.

* * * * *